Oct. 13, 1959    W. E. BRUNSDON ET AL    2,908,508
INFLATION CONTROL FOR AIR SUSPENSION
Filed May 27, 1957    2 Sheets-Sheet 1
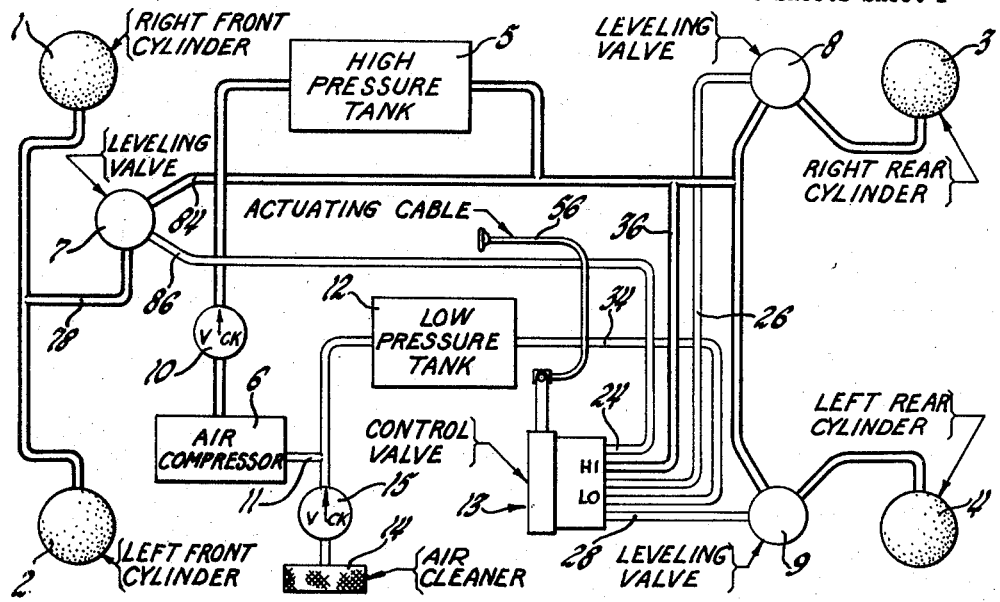
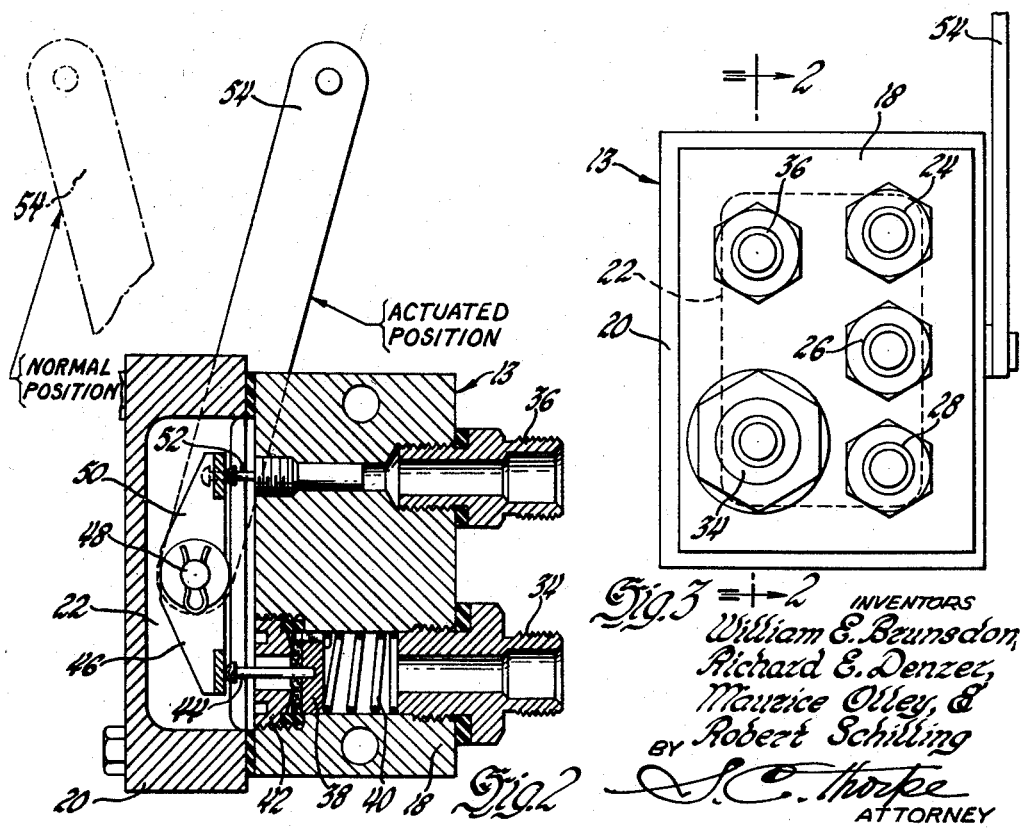
INVENTORS
William E. Brunsdon,
Richard E. Denzer,
Maurice Olley, &
BY Robert Schilling
ATTORNEY Oct. 13, 1959 W. E. BRUNSDON ET AL 2,908,508
INFLATION CONTROL FOR AIR SUSPENSION
Filed May 27, 1957 2 Sheets-Sheet 2

INVENTORS
William E. Brunsdon,
Richard E. Denzer,
Maurice Olley, &
BY Robert Schilling
S. C. Thorpe
ATTORNEY United States Patent Office 2,908,508
Patented Oct. 13, 1959

2,908,508

INFLATION CONTROL FOR AIR SUSPENSION

William E. Brunsdon, Clawson, Richard E. Denzer, East Detroit, Maurice Olley, Detroit, and Robert Schilling, Bloomfield Hills, Mich., assignors to General Motors Corporation, Detroit, Mich., a corporation of Delaware Application May 27, 1957, Serial No. 661,668

7 Claims. (Cl. 280—124)

This invention relates to air suspensions for automotive vehicles and the like having automatic leveling means responsive to vehicle load changes for varying the air pressure in the springs to maintain a substantially constant height of the sprung mass. More particularly, the invention provides for overruling such automatic leveling means when it is desired to increase the ground clearance under certain conditions such as when the vehicle is negotiating unusually rough terrain, or when it is desired to jack up one wheel of the vehicle for purposes of repairing a tire, etc.

In accordance with the invention, therefore, means have been provided in the form of valves and actuating controls therefor by which the normal function of the vehicle leveling valves which control the admission and exhaust of air under pressure from the springs are rendering ineffective, such that open communication between the springs and the high pressure air source is maintained until the pressure in the springs has been increased up to a predetermined maximum sufficient to abnormally extend their effective lengths in the load carrying direction, thus elevating the sprung portion of the vehicle and increasing its ground clearance in a simple and convenient manner. The aforementioned limitation of such additional air spring pressures to a predetermined maximum not only serves to prevent over-stressing of the spring and its associated parts during "jacking," but also operates in accordance with the invention to expedite the jacking operation by reducing the total volume of the exhaust side of the air suspension system required to be filled with the higher pressure air in order to accomplish the desired result.

Although the invention may be applied to various types of vehicle air suspension systems, for purposes of illustrating the broader principles involved it will be disclosed in what may be referred to as a substantially "closed" arrangement wherein the various air springs are arranged to receive air from a common high pressure tank which is charged by a compressor, and wherein the springs discharge or exhaust their air to a low pressure tank which, in turn, is connected to the compressor intake. Different modifications of the invention as disclosed refer to different arrangements for actuating the "leveling" of valves which control the admission and exhaust of air from and to the high and low pressure tanks, respectively.

A better understanding of the nature and advantages of the invention may be had from the following description, with reference to the drawings wherein:

Figure 1 is a diagrammatic view in plan of a vehicle air suspension and leveling system incorporating the control means of the invention.

Figure 2 is an enlarged sectional view of the control valve shown in Figure 1, taken substantially along the line 2—2 of Figure 3.

Figure 3 is an elevational view of the control valve, showing the various piping connections with the other parts of the system.

Figure 4:
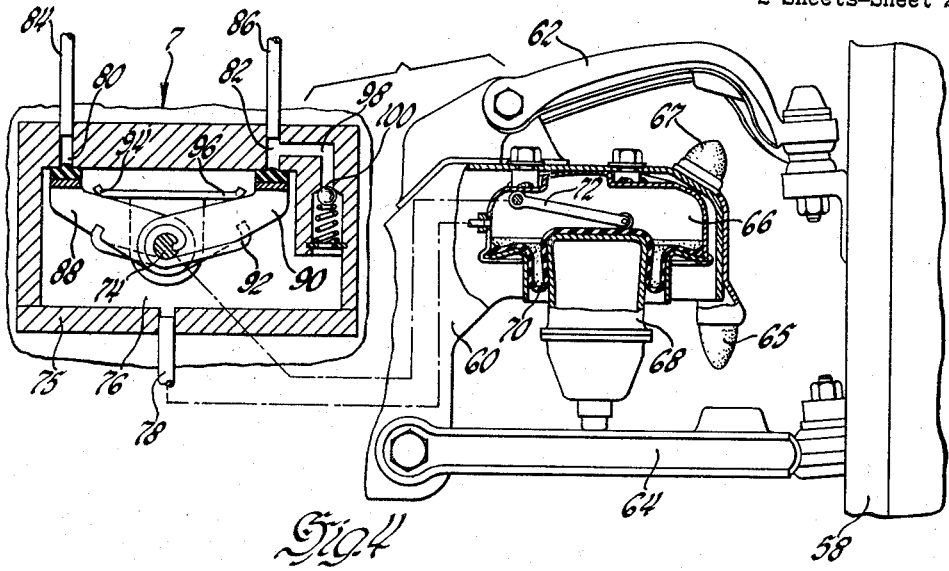
Figure 4 is a part elevation and part sectional view, more or less schematic in form, illustrating the parts of a typical wheel suspension of the vehicle represented in Figure 1, including the air spring, leveling valves and actuating linkage for these valves.

Referring now in detail to the drawings, and first to Figure 1, a system is illustrated which includes four air springs, 1, 2, 3 and 4, labeled "right front cylinder," "left front cylinder," etc. A source of air under substantially higher pressure than that normally maintained in any of the air spring cylinders is provided by a high pressure tank 5 which is charged by an air compressor 6, normally driven by the vehicle engine (not shown). Each of the various spring cylinders is connected by conduits (shown in heavy lines) through leveling valves 7, 8 and 9 to the high pressure tank. A one-way flow valve 10 labeled "V CK" is inserted in the high pressure line between the compressor 6 and the high pressure tank 5 so as to prevent back-flow through the compressor when the latter is not operating, as during a time when the vehicle is parked with its engine not running. The intake 11 to the compressor 6 is connected by suitable conduits (shown in light lines) to a low pressure tank 12, and thence to each of the leveling valves through a "control valve" 13, later to be described. The air compressor intake line 11 is also connected to be supplied with air at atmospheric pressure through an air cleaner 14, such latter air supply being available only for purposes of making up losses due to leakage in the system, there being a check valve 15 between the air cleaner and the compressor to prevent dissipating super-atmospheric pressure to the air cleaner from the low pressure tank.

As shown in Figures 2 and 3, the control valve comprises a valve body 18 and cover 20 defining a chamber 22. Interconnected via the chamber 22 in the body 18 are the three exhaust lines 24, 26 and 28 leading from the leveling valves 7, 8 and 9, respectively. Also, connecting with the chamber 22 in the valve body 18 are the air flow return line 34 to the low pressure tank and the line 36 which connects to the high pressure tank. In series with the return line 34 within the control valve body is a check valve 38 normally held closed by a coil spring 40 urging it against the valve seat 42. Projecting into the chamber 22 from the valve 38 is a stem or pin 44 engageable by one arm of a rocker 46 pivotable about a fixed axis represented by the shaft 48. The other arm 50 of the rocker is engageable with a pin 52 of a similar but somewhat smaller check valve controlling high pressure air flow into the chamber 22 through the body 18 from the passage 36. This latter valve is constructed similarly to those conventionally used in automobile tires, and in the position of its pin 52 as shown in solid lines is held open by the rocker arm 50 against the biasing force of the high pressure air in passage 36 tending to urge the valve to its closed position in which the pin is shown in broken outline. The rocker member 46, 50 for actuating the pins 44 and 52 is operatively fixed to a lever 54 which, in turn, may be remotely shifted between its "actuated position" and "normal position" via a push-pull cable 56 (Figure 1) manually controlled from the vehicle instrument panel. As will be seen from Figure 2, when the lever 54 is shifted to its "normal position" shown in broken outline the rocker 46, 50 rotates counter-clockwise to allow the high pressure check valve of pin 52 to close, while actuating the stem 44 of the low pressure return check valve to its open position.

Referring to Figure 4, the vehicle left front wheel 58 is shown linked to the frame 60 by upper and lower swing arms 62 and 64, with the vehicle load being supported by a typical air spring 66 interposed between the frame 60 and the lower arm 64. Maximum displacement of the wheel is limited by the arms engaging bump and rebound stops 65 and 67 on frame 60. As shown, the spring 66 comprises the cylinder 2 formed in or suitably fixed to the frame and telescopically receiving a piston 68 carried by the lower link 64. Sealing of the piston to the cylinder is effected by a flexible diaphragm 70 whose center portion overlies the head of the piston and is engaged by a roller follower arm 72 which transmits the reciprocating motion of the piston to a shaft 74 of the leveling valve 7. The valve 7 is represented as comprising a valve body 75 within which is a chamber 76 connected by a conduit 78 to the cylinder 1. Ports 80 and 82 from the chamber 76 connect with high pressure supply line 84 and low pressure discharge line 86, respectively, leading to the high pressure tank 5 and the aforementioned chamber 22 of the control valve 13. The leveling valve shaft 74 is suitably journaled in the leveling valve body 75, and journaled on the shaft 74 are intake and exhaust valves 88 and 90 which are oppositely biased by a torsion spring 92 so as to normally close the ports 80 and 82, respectively. Lateral extensions 94 and 96 of the shaft 74 engage portions of the respective intake and exhaust valves 88, 90, such that rotation of the shaft in the clockwise direction (as viewed in Figure 4) occasioned by downward movement of the air spring piston 68 results in opening the exhaust port 82. In opposite manner, counterclockwise rotation of the shaft 74 with upward movement of the air spring piston 68 results in opening the intake port 80 for admission of high pressure air from the tank 5 into the cylinder 1. Because of the relatively high strength of the torsion spring 92 its biasing force on the valves 88 and 90 is sufficiently great to maintain these valves closed against pressures in excess of those available in the high pressure tank 5. The latter pressure is at all times available in the port 80, and is also available in the "exhaust port" 82 when the check valve 52 (Figure 2) is held open by the lever 54 being placed in its "actuated position." In order, therefore, for high pressure air from the tank 5 to be introduced into the air spring for "jacking" purposes when the control valve lever 54 is in its "actuated position," there is provided a bypass 98 in the leveling valve body 75 (Figure 4) extending from the port 82 to the valve chamber 76. One-way flow through this bypass is accommodated by a light spring biased check valve 100 which remains closed except during such "jacking."

It will be appreciated that the leveling valves 8 and 9 associated with the vehicle rear wheel air spring cylinders are similarly constructed to operate in the manner described above for the front leveling valve 7.

During normal operation of the vehicle the control valve lever 54 will be in its "normal position" shown in broken outline in Figure 2, wherein it maintains the check valve 38 in open position to permit free flow of exhaust air from the various leveling valve exhaust ports 82 to the low pressure tank 12. Should occasion arise where the vehicle must be driven over uneven terrain and it is desired to temporarily increase the ground clearance, or should it be necessary to jack up one wheel of the vehicle for purposes of repairing a tire, etc., the control valve lever 54 is shifted to its "actuated position" shown in Figure 2. This results in placing the control valve chamber 22 in open communication with the high pressure tank 5 via the passage 36, while at the same time allowing the check valve 38 to close. High pressure air is thereupon caused to flow in reverse direction through the various exhaust lines 24, 26 and 28 to the respective "exhaust ports" 82 in the leveling valves and thence via the bypass 98 in each to the air spring cylinders. Since the spring 40 (Figure 2) is selected to maintain the check valve 38 closed until a presure is built up in the air spring cylinders and the chamber 22 substantially greater than that normally existent therein each air spring will be automatically extended in its load supporting direction to elevate the vehicle frame 60 relative to the wheel 58 to a height at which the rebound stop 67 engages the suspension upper arm 62. During this "jacking" period, since the check valve 38 remains closed none of the additional air thus drawn from the high pressure tank is permitted to pass into the low pressure tank, with the result that "jacking" is expedited and the use of high pressure air from the tank 5 is minimized. Should, however, the control lever 54 be inadvertently left in its "actuated position" for an unneccessary period of time, the check valve 38 will open at its predetermined pressure seating to limit the pressure build-up in the air spring lines, thus assuring these parts will not be over-stressed in any event. When it is desired to again lower the vehicle body to its normally suspended height the control lever is returned to its "normal position," shutting off further high pressure air delivery to the air spring exhaust lines and reconnecting them to the low pressure tank 12 via the open check valve 38.

Figure 5:
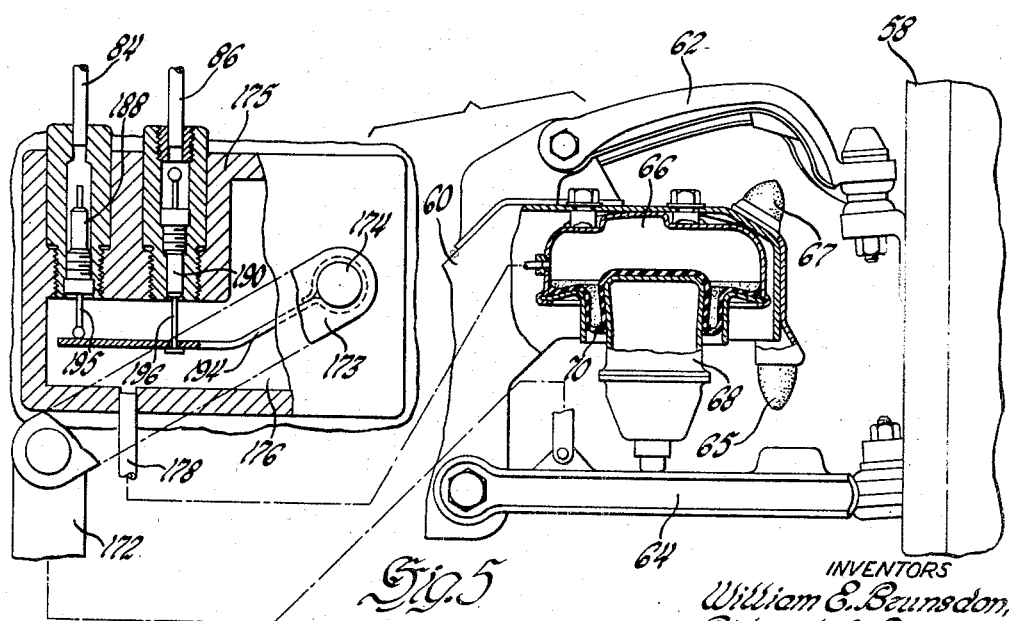
Figure 5 is a view similar to Figure 4, but showing a different arrangement of leveling valve and actuating linkage therefor.

In Figure 5 is shown a similar construction to that of Figure 4, differing only in the arrangement of the intake and exhaust leveling valves 188 and 190, respectively, and their actuating linkage. Both the valves 188, 190 are of the "tire valve" type, being biased to their closed positions primarily by the higher pressures normally applied to them in their closing direction. Thus, the intake valve 188 is normally held closed by the higher pressure existing in the line 84 which connects with the high pressure tank 5, and the exhaust valve 190 is biased closed by the higher pressure existing in the air spring 66 than normally exists in the "exhaust" line 86. Similarly, as in the case of the leveling valves described in Figure 4, the valve body 175 contains a valve chamber 176 in open communication with the air spring 66 by an inlet line 178. A leveling valve control link 172 connected to the suspension lower arm 64 operates through a crank arm 173 during change in vertical height of the wheel to rotate a shaft 174 journaled in the leveling valve body 175. A second arm 194 fixed to this shaft is arranged for engagement with the respective valve stems 195, 196 such that when the vehicle wheel rises from its normal position relative to the frame 60 the inlet valve 188 is opened to introduce high pressure air to the spring, and during opposite wheel movements the exhaust valve 190 opens to permit discharge of air from the air spring. Since the exhaust valve 190 is openable in response to a higher pressure being developed in the line 86 than that existing in the air spring cylinder, no such bypass 98 as described with reference to Figure 4 is required in applying the "jacking" control valve 13 to this leveling valve arrangement. Accordingly, movement of the control valve lever 54 (Figure 2) to its "actuated position" will serve to effect elevation of the sprung portion of the vehicle in the same manner as described above.

It is appreciated that numerous minor changes in the construction and arrangement of the parts may be made without departing from the spirit and scope of the invention as defined in the following claims.

We claim:

1. In an air suspended vehicle having at least one vehicle load supporting air spring and means for regulating the pressure in said spring to maintain its length in the load supporting direction substantially constant during normal vehicle operation, said means including a source of air under greater pressure than required by the air spring, an air inlet passage to the spring from said source, an air exhaust passage from the spring and valve means normally closing said passages but openable to accommodate air flow therethrough in response to contraction and expansion of the spring, respectively, the combination therewith of a device for introducing air into the spring from said source to abnormally expand the spring and thus elevate that portion of the vehicle suppored thereby, said device including a chamber having an inlet from said source, an exhaust outlet and an air delivery connection to the spring, an inlet valve closing said inlet in response to air pressure from said source but openable in opposition to said source pressure, an outlet valve, biasing means normally holding said outlet valve closed, said outlet valve being openable in opposition to said biasing means in response to a predetermined chamber pressure, and a member engageable with said inlet valve and movable to acutate the same in its opening direction.

2. The invention of claim 1 wherein said member is also engageable with said outlet valve and is oppositely movable to actuate the same in its opening direction, said air exhaust passage terminates in said chamber, and wherein said valve means normally closing said exhaust passage is also openable in response to chamber pressure exceeding the pressure within the spring.

3. The invention of claim 1 wherein said member is also engageable with said outlet valve and is oppositely movable to actuate the same in its opening direction, and wherein a one-way valve is located at the air spring end of said air delivery connection to prevent flow into said chamber from the spring while accommodating reverse flow through said air delivery connection.

4. In a suspension including sprung and unsprung members, a pressure fluid filled cylinder defined by two relatively movable parts secured respectively to said members, a source of fluid at higher pressure than the fluid pressure in the cylinder, an inlet passage to the cylinder from said source, a cylinder exhaust passage, and valves normally closing said inlet and exhaust passages respectively, but openable in response to relative movements of said members in directions tending to contract and expand the cylinder, respectively, and means for selectively increasing the cylinder pressure to abnormally increase the volume thereof and thereby elevate the sprung member relative to the unsprung member, said means including a fluid flow connection between said source and said cylinder, two check valves in said connection, one of said check valves being arranged to normally block flow through said connection from the source to said cylinder, said connection having a pressure relief opening, the other of said check valves being arranged to normally block flow out of said opening but being openable by a predetermined pressure in said connection, and a common actuator engageable with said check valves and selectively moveable between an actuated position in which said one check valve is held open and a normal position in which said other check valve is held open.

5. The invention of claim 4, wherein the valve normally closing said cylinder exhaust passage is also openable in response to an exhaust back pressure exceeding the pressure in the cylinder, and wherein said connection to the cylinder includes said exhaust passage.

6. In an air suspended vehicle having a plurality of load supporting air springs and means for regulating the pressure in said springs to maintain their lengths in the load supporting direction substantially constant during normal vehicle operation, said means including a source of air under greater pressure than normally contained in any of the air springs, air inlet passages to the springs from said source, air exhaust passages from the respective springs, a tank adapted to receive exhaust air from the springs, and vehicle leveling means including valves associated with said springs and controlling flow through said passages in response to changes in said spring lengths, the combination therewith of a chamber interconnecting said exhaust passages, a pressure relief valve openable to the tank from said chamber, biasing means normally holding said relief valve closed, a chamber inlet opening connected to said pressure source, an inlet valve controlling flow into the chamber via said inlet opening from said pressure source, biasing means normally holding said inlet valve closed, an exhaust valve by-pass interconnecting each said exhaust passage and its respective spring, a check valve in each said by-pass accommodating air flow therethrough only in the direction toward the spring, and a common actuator for selectively opening either of said inlet valve or said pressure relief valve in opposition to their respective biasing means, said actuator having a normal position operative to maintain said relief valve open and an actuated position operative to maintain said inlet valve open.

7. In an air suspended vehicle having a plurality of load supporting air springs, air spring pressure supply means and exhaust means for said springs, control means for said supply and exhaust means responsive to relative change in loading of said springs for maintaining predetermined extensions of the springs in the load supporting direction, and means for over-ruling said control means to effect an increase in said predetermined spring extensions, said control over-ruling means including a valve chamber adapted to be interconnected with said pressure supply means and each of said air springs, valve means for controlling flow through said chamber from said pressure supply means to said springs, said valve means including chamber pressure limiting means operative at a predetermined pressure substantially exceeding the maximum pressure required in any spring to maintain its said predetermined extension.

References Cited in the file of this patent

UNITED STATES PATENTS

| | | |
|---|---|---|
| 1,641,640 | Myers | Sept. 6, 1927 |
| 2,443,433 | Sanmori | June 15, 1948 |
| 2,844,386 | Pribonic | July 22, 1958 |